(12) United States Patent
Bellet et al.

(10) Patent No.: US 9,964,240 B2
(45) Date of Patent: May 8, 2018

(54) POLYAMIDE HOSE FOR COMPRESSED AIR

(71) Applicant: ARKEMA FRANCE, Colombes (FR)

(72) Inventors: Gaelle Bellet, Evreux (FR); Nicolas Amouroux, Kyoto (JP); Thibaut Montanari, Menneval (FR)

(73) Assignee: ARKEMA FRANCE, Colombes (FR)

( * ) Notice: Subject to any disclaimer, the term of this patent is extended or adjusted under 35 U.S.C. 154(b) by 0 days. days.

(21) Appl. No.: 15/467,526

(22) Filed: Mar. 23, 2017

(65) Prior Publication Data

US 2017/0241575 A1 Aug. 24, 2017

Related U.S. Application Data

(62) Division of application No. 12/161,578, filed as application No. PCT/FR2007/000118 on Jan. 22, 2007, now Pat. No. 9,664,312.

(60) Provisional application No. 60/791,820, filed on Apr. 13, 2006.

(30) Foreign Application Priority Data

Jan. 22, 2007 (FR) ...................... 06 00517

(51) Int. Cl.
| B21B 1/08 | (2006.01) |
|---|---|
| F16L 11/12 | (2006.01) |
| B32B 1/08 | (2006.01) |
| B32B 27/34 | (2006.01) |
| F16L 11/04 | (2006.01) |
| B32B 27/08 | (2006.01) |
| B32B 27/36 | (2006.01) |
| B32B 27/28 | (2006.01) |

(52) U.S. Cl.
CPC ............... *F16L 11/12* (2013.01); *B32B 1/08* (2013.01); *B32B 27/08* (2013.01); *B32B 27/285* (2013.01); *B32B 27/34* (2013.01); *B32B 27/36* (2013.01); *B32B 27/365* (2013.01); *F16L 11/04* (2013.01); *B32B 2250/24* (2013.01); *B32B 2307/546* (2013.01); *Y10T 428/1393* (2015.01)

(58) Field of Classification Search
CPC ................................. B32B 1/08; B32B 327/08
USPC ................ 138/141, 125, 137; 428/34.1, 35.7
See application file for complete search history.

(56) References Cited

U.S. PATENT DOCUMENTS

| 5,425,817 | A | 6/1995 | Mugge et al. |
|---|---|---|---|
| 5,474,109 | A | 12/1995 | Stoeppelmann et al. |
| 5,478,620 | A | 12/1995 | Mugge et al. |
| 6,451,395 | B1 | 9/2002 | Ries et al. |
| 6,616,191 | B2 | 9/2003 | Beal et al. |
| 7,175,896 | B2 * | 2/2007 | Schmitz ............. B32B 1/02 138/137 |
| 2003/0021275 | A1 | 1/2003 | Shabeer |
| 2003/0045639 | A1 * | 3/2003 | Iwata ............... C08K 5/1345 525/178 |
| 2003/0099799 | A1 | 5/2003 | Koike et al. |
| 2003/0124288 | A1 | 7/2003 | Merziger et al. |
| 2004/0071913 | A1 | 4/2004 | Bellet |
| 2004/0134555 | A1 | 7/2004 | Powell et al. |
| 2006/0074158 | A1 | 4/2006 | Blondel et al. |

FOREIGN PATENT DOCUMENTS

EP 1741549 A1 1/2007

* cited by examiner

*Primary Examiner* — Ellen S Wood
(74) *Attorney, Agent, or Firm* — Millen, White, Zalano and Branigan, P.C.

(57) ABSTRACT

The present invention relates to a multilayer hose for compressed air comprising, in this order:
- an outer layer (1) made of polyamide,
- optionally an intermediate layer (2) of a polymer having a flexural modulus of less than 500 MPa,
- an inner layer (3) of a polymer having a flexural modulus of greater than 1100 MPa, the inner layer (3) being in contact with the compressed air.

11 Claims, No Drawings

POLYAMIDE HOSE FOR COMPRESSED AIR

FIELD OF THE INVENTION

The present invention relates to polyamide hoses for compressed air. They are of use in delivering compressed air to equipment, machine tools and various devices and also in brake circuits in high power vehicles.

THE PRIOR ART AND THE TECHNICAL PROBLEM

U.S. Pat. No. 6,066,377 discloses hoses for brake circuits. These hoses are composed of an inner layer made of polyamide 11 or 12 (in contact with the braking air) and of an outer layer made of polyamide 11 or 12 and, between these layers, there are present one or two layers of high density polyethylene (HDPE) and optionally a polyester reinforcing braid. The HDPE must be radiation-crosslinked, in order for the tube to have mechanical strength, in particular burst strength, and it must also comprise a functionalized polyolefin, in order to create adhesion between the polyamide and the HDPE. The examples are not reproducible and produce random results. The mechanical properties of HDPE are inadequate and weaken the tube.

Patent application FR 2 812 928 discloses layered polyamide tubing for compressed air brakes formed of outer and inner layers of polyamide 11 or 12 with median layers made of polyamide 6 comprising, by weight, 14% of a plasticizer (butylbenzenesulfonamide), 7% of residual caprolactam, 10% of maleic-anhydride-grafted EPDM elastomer and 5% of maleic-anhydride-grafted polyethylene. The layers of polyamide 6 and of polyamide 11 or 12 are bonded together with a tie layer. The tie layer is preferably a polyamide 6, 12 or an anhydride-modified polyolefin. The plasticizer and the residual caprolactam of the PA 6 layers exude and cause delamination of the layers and stiffening of the PA 6 layers. The hose no longer exhibits satisfactory mechanical properties. Furthermore, polyamide 6 has a much greater water uptake than that of PA 11 or PA 12 and thus its mechanical properties are substantially degraded.

Patent application GB 2 367 108 discloses layered polyamide tubing for compressed air brakes formed of outer and inner layers of polyamide 11 or 12 with median layers made of polyamide 6 or 6, 6 and a reinforcing braid also positioned inside the structure between the layers of PA 11 or PA 12.

Patent application EP 1 378 696 discloses a multilayer hose for compressed air comprising:
an inner layer in contact with the compressed air made of polyamide chosen from PA 11 or PA 12,
an outer layer made of polyamide chosen from the same products as the inner layer and which can be identical or different,
at least one intermediate layer positioned between the inner layer and the outer layer chosen from blends of polyamide and of polyolefin comprising a polyamide matrix, copolymers comprising polyamide blocks and polyether blocks, or blends of polyamides and of copolymers comprising polyamide blocks and polyether blocks.

A reinforcing braid may be positioned between the inner layer and the outer layer.

Thus, the prior art has disclosed layered polyamide tubing for compressed air brakes formed of inner and outer layers of polyamide 11 or 12 with inner layers made of polymers other than PA 11 or PA 12. Inside the structure, either a reinforcing braid or a crosslinked polymer or a reinforcing braid and a crosslinked polymer are positioned between the layers of PA 11 or PA 12. These tubes are manufactured by coextrusion of the various layers but the presence of the braid makes it necessary to carry out the coextrusion several times. Likewise, the crosslinked polymer has to be coextruded in the noncrosslinked state and must then be crosslinked subsequently, which adds an operation. It has now been found that the braid can be replaced by a high-modulus polymer. This hose can also comprise one or more layers of flexible polymer (low-modulus polymer), so as to retain the flexibility of the hose. In the present text, "high-modulus polymer" means "polymer with a high flexural modulus", that is to say having a flexural modulus of greater than 1100 MPa, and "low-modulus polymer" means "polymer with a low flexural modulus" and is targeted at a polymer having a flexural modulus of less than 500 MPa.

BRIEF DESCRIPTION OF THE INVENTION

The present invention relates to a multilayer hose for compressed air comprising, in this order:
an outer layer (1) made of polyamide,
optionally an intermediate layer (2) of a flexible polymer,
an inner layer (3) of a high-modulus polymer,
the inner layer (3) being in contact with the compressed air.

More particularly, the present invention relates to a multilayer hose for compressed air comprising, in this order:
   an outer layer (1) made of polyamide,
   optionally an intermediate layer (2) of a polymer having a flexural modulus of less than 500 MPa,
   an inner layer (3) of a polymer having a flexural modulus of greater than 1100 MPa, the inner layer (3) being in contact with the compressed air.

According to the invention, the polyamide of the outer layer (1) chosen from:
   PA11,
   PA12,
   a polyamide A corresponding to the formula X,Y/Z or 6,Y2/Z, in which:
     X denotes the residues of an aliphatic diamine having from 6 to 10 carbon atoms,
     Y denotes the residues of an aliphatic dicarboxylic acid having from 10 to 14 carbon atoms,
     Y2 denotes the residues of an aliphatic dicarboxylic acid having from 15 to 20 carbon atoms,
     Z denotes at least one unit chosen from the residues of a lactam, the residues of an α, ω-aminocarboxylic acid and the unit X1,Y1 in which X1 denotes the residues of an aliphatic diamine and Y1 denotes the residues of an aliphatic dicarboxylic acid,
   the ratios by weight Z/(X+Y+Z) and Z/(6+Y2+Z) being between 0 and 15%, and
   a semiaromatic polyamide B which can in particular correspond to the formula X/Y, Ar, in which:
     Y denotes the residues of an aliphatic diamine having from 8 to 20 carbon atoms,
     Ar denotes the residues of aromatic dicarboxylic acid,
     X either denotes the residues of aminoundecanoic acid $NH_2$—$(CH_2)_{10}$—COOH, of lactam 12 or of the corresponding amino acid, or denotes the unit Y, x, the residue of the condensation of the diamine with an aliphatic diacid (x) having between 8 and 20 carbon atoms, or denotes the unit Y, I, the residue of the condensation of the diamine with isophthalic acid.

According to a variant of this first form, a tie can be positioned between at least two of these layers. According to another variant, at least one of the layers comprises a product which facilitates adhesion to the adjacent layer. It would not be departing from the scope of the invention to use a combination of these two variants.

According to a second form, the present invention to a multilayer hose for compressed air comprising, in this order:
an outer layer (1) made of polyamide,
optionally a layer (2) of a flexible polymer,
an intermediate layer (3) of a high-modulus polymer,
optionally a layer (4) of a flexible polymer,
an inner layer (5) chosen from polyamides, blends of polyamide and of polyolefin comprising a polyamide matrix, copolymers comprising polyamide blocks and polyether blocks, or blends of polyamides and of copolymers comprising polyamide blocks and polyether blocks,
the inner layer (5) being in contact with the compressed air.

Thus, according to this second form of the invention, the hose described above, comprising two or three layers, can additionally comprise, starting from the inner layer (3) of the polymer having a flexural modulus of greater than 1100 MPa and in this order:
optionally a layer (4) of a polymer having a flexural modulus of less than 500 MPa, and
an inner layer (5) of a polymer chosen from polyamides, blends of polyamide and of polyolefin comprising a polyamide matrix, copolymers comprising polyamide blocks and polyether blocks, and blends of polyamides and of copolymers comprising polyamide blocks and polyether blocks, the inner layer (5) being in contact with the compressed air.

According to a variant of this second form, a tie can be positioned between at least two of these layers. According to another variant, at least one of the layers comprises a product which facilitates adhesion to the adjacent layer. It would not be departing from the scope of the invention to use a combination of these two variants.

According to a variant of these two forms of the invention, a reinforcing braid can be positioned in the layer of high-modulus polymer, that is to say that the layer of high-modulus polymer is replaced by these 3 adjacent layers successively composed of a layer of high-modulus polymer, of a braid and of a layer of high-modulus polymer.

DETAILED DESCRIPTION OF THE INVENTION

As regards the outer layer (1) made of polyamide, mention may be made of PA 11 and PA 12.

Mention may also be made of polyamide A of formula X,Y/Z or 6,Y2/Z, in which:
X denotes the residues of an aliphatic diamine having from 6 to 10 carbon atoms,
Y denotes the residues of an aliphatic dicarboxylic acid having from 10 to 14 carbon atoms,
Y2 denotes the residues of an aliphatic dicarboxylic acid having from 15 to 20 carbon atoms,
Z denotes at least one unit chosen from the residues of a lactam, the residues of an α,ω-aminocarboxylic acid, or the unit X1,Y1 in which X1 denotes the residues of an aliphatic diamine and Y1 denotes the residues of an aliphatic dicarboxylic acid,
the ratios by weight $Z/(X+Y+Z)$ and $Z/(6+Y2+Z)$ being between 0 and 15%.

Mention may be made, as examples, of PA 6,10 (hexamethylenediamine and sebacic acid units), PA 6,12 (hexamethylenediamine and dodecanedioic acid units), PA 6,14 (hexamethylenediamine and $C_{14}$ diacid units), PA 6,18 (hexamethylenediamine and $C_{18}$ diacid units) and PA 10,10 (1,10-decanediamine and sebacic acid units).

Polyamide A is preferably chosen from PA 6,14, PA 6,18 and PA 10,10.

Mention may also be made of a semiaromatic polyamide B.

Polyamide B can in particular correspond to the formula X/Y, Ar, in which:
Y denotes the residues of an aliphatic diamine having from 8 to 20 carbon atoms,
Ar denotes the residues of an aromatic dicarboxylic acid,
either denotes the residues of aminoundecanoic acid $NH_2-(CH_2)_{10}-COOH$, of lactam 12 or of the corresponding amino acid, or denotes the unit Y,x, the residue of the condensation of the diamine with an aliphatic diacid (x) having between 8 and 20 carbon atoms, or denotes the unit Y,I, the residue of the condensation of the diamine with isophthalic acid.

Preferably, polyamide B denotes:
11/10, T, which results from the condensation of aminoundecanoic acid, of 1,10-decanediamine and of terephthalic acid,
12/12, T, which results from the condensation of lactam 12, of 1,12-dodecanediamine and of terephthalic acid,
10,10/10, T, which results from the condensation of sebacic acid, of 1,10-decanediamine and of terephthalic acid,
10,I/10, T, which results from the condensation of isophthalic acid, of 1,10-decanediamine and of terephthalic acid.

This list is not exhaustive and mention may also be made of semiaromatic polyamides B, PA 6,I/6, T, PA 6,6/6,I/6,T and PA 6/6, T.

The intrinsic viscosity of the polyamide of the outer layer (1) can be between 1 and 2 and advantageously between 1.2 and 1.8. The intrinsic viscosity is measured at 20° C. for a concentration of 0.5% in meta-cresol. The polyamide of the outer layer (1) can comprise from 0 to 30% by weight of at least one product chosen from plasticizers and impact modifiers for respectively 100 to 70% of polyamide. This polyamide can comprise the usual additives: stabilizers, including UV stabilizers, antioxidants, flame retardants.

The polyamide of the outer layer (1) can comprise at least one product chosen from plasticizers, impact modifiers and optionally catalyzed polyamides.

As regards the plasticizer, it is chosen from benzenesulfonamide derivatives, such as n-butylbenzenesulfonamide (BBSA), ethyltoluene-sulfonamide or N-cyclohexyltoluene-sulfonamide; esters of hydroxybenzoic acids, such as 2-ethylhexyl para-hydroxybenzoate and 2-decylhexyl para-hydroxybenzoate; esters or ethers of tetrahydrofurfuryl alcohol, such as oligoethyleneoxytetrahydrofurfuryl alcohol; or esters of citric acid or of hydroxymalonic acid, such as oligoethyleneoxy malonate. Mention may also be made of decylhexyl para-hydroxybenzoate and ethylhexyl para-hydroxybenzoate. A particularly preferred plasticizer is n-butylbenzenesulfonamide (BBSA).

As regards the impact modifier, mention may be made, for example, of polyolefins, crosslinked polyolefins, EPR, EPDM, SBS and SEBS elastomers, it being possible for these elastomers to be grafted in order to facilitate their compatibilization with the polyamide, or copolymers comprising polyamide blocks and polyether blocks. These copolymers comprising polyamide blocks and polyether blocks are known per se; they are also denoted by the name PEBA (poly(ether-block-amide)) and are sold by the Applicant Company under the name Pebax®. Mention may also be made of acrylic elastomers, for example those of the NBR, HNBR or X-NBR type. The polyolefins of use as impact modifier are, for example, ethylene/alkyl (meth)acrylate/ maleic anhydride (or glycidyl methacrylate) copolymers. They are sold by the Applicant Company under the name of Lotader®.

As regards the optionally catalyzed polyamide, this is a polyamide different from the base polyamide of the layer (1). Advantageously, this is a polyamide comprising a polycondensation catalyst, such as an inorganic or organic acid, for example phosphoric acid. The catalyst may be added to the polyamide after its preparation by any process or, very simply and preferably, be the residue of the catalyst used for its preparation. Polymerization and/or depolymerization reactions may very substantially take place during the blending of this catalyzed polyamide and of the polyamide of the outer layer. The amount of catalyst can be between 5 ppm and 15 000 ppm of phosphoric acid with respect to the catalyzed polyamide. The amount of catalyst can be up to 3000 ppm and advantageously between 50 and 1000 ppm. For other catalysts, for example boric acid, the contents will be different and can be appropriately chosen according to the usual techniques for the polycondensation of polyamides.

The proportion of plasticizer can be (by weight) between 5 and 20% (advantageously between 10 and 15%), the impact modifier between 0 and 5%, the optionally catalyzed polyamide between 0 and 5% and the remainder to 100% of polyamide of the outer layer.

Advantageously, the polyamide of the outer layer is PA 12. If optionally catalyzed polyamide is added to this polyamide, then this polyamide is advantageously PA 11.

As regards the preparation of the compositions of the outer layer, they can be prepared by melt blending the constituents according to the usual techniques for thermoplastics. The outer layer can also comprise the usual additives for polyamides, such as UV stabilizers, antioxidants, pigments or flame retardants.

As regards the inner layer (5) and first the polyamides, they can be chosen from those of the outer layer (1). The polyamide of this layer (5) can be identical to or different from that of the layer (1). The polyamide of the layer (5) can also be PA 6 or PA 6,6.

With regard to the blends of polyamide and of polyolefin comprising a polyamide matrix, these are advantageously blends of polyamide and of polyolefin comprising a polyamide matrix and a dispersed polyolefin phase. In the blends of polyamide and of polyolefins comprising a polyamide matrix and a dispersed polyolefin phase, the term "polyolefin" denotes both homopolymers and copolymers and both thermoplastics and elastomers. They are, for example, copolymers of ethylene and of an α-olefin. These polyolefins can be PEs, EPRs or EPDMs. They can be functionalized in all or part. In addition, the term "polyethylene" is understood to mean copolymers of ethylene and of an alkyl (meth)acrylate, it being possible for these copolymers also to comprise functional groups, for example acid or acid anhydride or epoxy functional groups. The dispersed phase can be a blend of one or more nonfunctionalized polyolefins and of one or more functionalized polyolefins. Advantageously, the polyamide matrix represents 50 to 65% by weight for respectively 50 to 15% of dispersed phase. Preferably, the polyamide matrix represents 55 to 80% by weight for respectively 45 to 20% of dispersed phase. In these blends of polyamide and of polyolefin comprising a polyamide matrix, the polyamide is preferably PA 6.

With regard to the copolymers comprising polyamide blocks and polyether blocks, they result from the copolycondensation of polyamide sequences comprising reactive ends with polyether sequences comprising reactive ends, such as, inter alia:
1) Polyamide sequences comprising diamine chain ends with polyoxyalkylene sequences comprising dicarboxyl chain ends.
2) Polyamide sequences comprising dicarboxyl chain ends with polyoxyalkylene sequences comprising diamine chain ends.
3) Polyamide sequences comprising dicarboxyl chain ends with polyether dials, the products obtained being, in this specific case, polyetheresteramides. Use is advantageously made of these copolymers.

With regard to the blends of polyamides and of copolymers comprising polyamide blocks and polyether blocks, this amounts to replacing a portion of the polyamide with a copolymer comprising polyamide blocks and polyether blocks, that is to say using a blend comprising at least one of the polyamides mentioned above for the layer (5) and at least one copolymer comprising polyamide blocks and polyether blocks. Mention may be made, for example, of the blends of (i) PA 6 and (ii) copolymer comprising PA 6 blocks and PTMG blocks, the blends of (i) PA 6 and (ii) copolymer comprising PA 12 blocks and PTMG blocks and the blends of (i) PA 12 and (ii) copolymer comprising PA 6 or PA 12 blocks and PTMG blocks.

As regards the intermediate layers (2) and (4) of flexible polymer, mention may be made, as examples, of polymers with a flexural modulus of less than 500 MPa and advantageously of between 80 and 300 MPa. Mention may be made, as examples, of ethylene copolymers and propylene copolymers.

As regards the inner layer (3) of polymer having a flexural modulus of greater than 1100 MPa, mention may be made of a polyamide, polycarbonate (PC), polyphenylene sulfide (PPS), polyphenylene oxide (PPO), polybutylene terephthalate (PBT) and polyethylene terephthalate (PET).

Advantageously, the polyamide of the inner layer (3) is chosen from PA 6, PA 6,6, PA 6,10, PA 6,12, an aromatic polyamide and a semiaromatic polyamide, such as those targeted under the term of "polyamide B" described above.

More preferably, the polymer having a flexural modulus of greater than 1100 MPa of the inner layer (3) is chosen from polycarbonate (PC), polyphenylene oxide (PPO), an aromatic polyamide and a semiaromatic polyamide.

As regards the optional tie layer, this term is used to denote any product which makes possible the adhesion of the layers. The tie can be a functionalized polyolefin carrying a carboxylic acid or carboxylic acid anhydride functional group. It can be blended with a nonfunctionalized polyolefin. The tie can also be a copolyamide.

As regards the copolyamide tie, the copolyamides which can be used in the present invention have a melting point (Standard DIN 53736B) of between 60 and 200° C. and their relative viscosity in solution can be between 1.3 and 2.2 (Standard DIN 53727, solvent m-cresol, concentration 0.5 g/100 ml, temperature 25° C. Ubbelohde viscometer). Their melt rheology is preferably similar to that of the materials of the layers which it is desired to make adhere.

The copolyamides originate, for example, from the condensation of α,ω-aminocarboxylic acids, of lactams or of dicarboxylic acids and diamines.

According to a first type, the copolyamides result from the condensation of at least two α,ω-aminocarboxylic acids or of at least two lactams having from 6 to 12 carbon atoms or of a lactam and of an aminocarboxylic acid not having the same number of carbon atoms in the optional presence of a chain-limiting agent which can, for example, be a monoamine or a diamine or a monocarboxylic acid or a dicarboxylic acid. Mention may in particular be made, among the chain-limiting agents, of adipic acid, azelaic acid, stearic acid, or dodecanediamine. The copolyamides of this first type can also comprise units which are residues of diamines and dicarboxylic acids.

Mention may be made, as examples of dicarboxylic acids, of adipic acid, nonanedioic acid, sebacic acid and dodecanedioic acid.

Mention may be made, as examples of α,ω-aminocarboxylic acids, of aminocaproic acid, aminoundecanoic acid and aminododecanoic acid.

Mention may be made, as examples of lactams, of caprolactam and lauryllactam.

According to a second type, the copolyamides result from the condensation of at least one α,ω-aminocarboxylic acid (or one lactam), at least one diamine and at least one dicarboxylic acid. The α,ω-aminocarboxyiic acid, the lactam and the dicarboxylic acid can be chosen from those mentioned above. The diamine can be a linear, branched or cyclic aliphatic diamine or also an arylic diamine. Mention may be made, as examples, of hexamethylenediamine, piperazine, isophoronediamine (IPD), methylpentamethylenediamine (MPDM), bis(aminocyclohexyl)methane (BACM) or bis(3-methyl-4-aminocyclohexyl)methane (BMACM). The processes for the manufacture of the copolyamides are known from the prior art and these copolyamides can be manufactured by polycondensation, for example in an autoclave.

According to a third type, the copolyamides are a blend of a copolyamide 6/12 rich in 6 and of a copolyamide 6/12 rich in 12. As regards the blend of copolyamides 6/12, one comprising, by weight, more of 6 than of 12 and the other more of 12 than of 6, the copolyamide 6/12 results from the condensation of caprolactam with lauryllactam. It is clear that "6" denotes the units derived from caprolactam and "12" denotes the units derived from lauryllactam. It would not be departing from the scope of the invention if the caprolactam were replaced, in all or part, by aminocaproic acid and likewise for the lauryllactam, which can be replaced by aminododecanoic acid. These copolyamides can comprise other units provided that the ratios of the proportions of 6 and of 12 are observed.

Advantageously, the copolyamide rich in 6 comprises 60 to 90% by weight of 6 for respectively 40 to 10% of 12.

Advantageously, the copolyamide rich in 12 comprises 60 to 90% by weight of 12 for respectively 40 to 10% of 6.

With regard to the proportions of the copolyamide rich in 6 and of the copolyamide rich in 12, they can be, by weight, from 40/60 to 60/40 and preferably 50/50.

These blends of copolyamides can also comprise up to 30 parts by weight of other (co)polyamides or of grafted polyolefins per 100 parts of the copolyamides rich in 6 and rich in 12.

These copolyamides have a melting point (Standard DIN 53736B) of between 60 and 200° C. and their relative viscosity in solution can be between 1.3 and 2.2 (Standard DIN 53727, solvent m-cresol, concentration 0.5 g/100 ml, temperature 25° C., Ubbelohde viscometer). Their melt rheology is preferably similar to that of the materials of the adjacent layers. These products are manufactured by the usual techniques for polyamides. Processes are disclosed in U.S. Pat. Nos. 4,424,864, 4,483,975, 4,774,139, 5,459,230, 5,489,667, 5,750,232 and 5,254,641.

According to another variant, at least one of the layers comprises a product which facilitates adhesion to the adjacent layer. This product can be one of the ties which have just been defined above.

The internal diameter of the hoses of the present invention can be between 4 and 30 mm and advantageously between 5 and 25 mm. Their thickness can be between 0.5 and 5 mm.

These hoses are manufactured by coextrusion. In those which comprise a reinforcing braid, it is positioned after having extruded the layers closest to the inside and then the other layers will be coextruded above this braid by a "crosshead" device. Several intermediate layers and one or more braids can be inserted. All these techniques are known per se.

The hoses of the present invention have very good chemical resistance of their outer layer, in particular have zinc chloride resistance. They also have very good mechanical strength, in particular allowing them to be connected using clamp connectors.

What is claimed is:

1. A multilayer hose for compressed air consisting of, in this order:
   an outer layer (1) made of polyamide, and
   an inner layer (3) of a polymer having a flexural modulus of greater than 1100 MPa, the inner layer (3) being in contact with compressed air, wherein said inner layer polymer (3) is three adjacent layers successively composed of a layer of polymer having a flexural modulus of greater than 1100 MPa, of a braid and of a layer of polymer having a flexural modulus of greater than 1100 MPa, wherein the polyamide of the outer layer (1) is chosen from:
   PA11,
   PA12,
   a polyamide A corresponding to the formula X,Y/Z or 6,Y2/Z, in which:
   X denotes the residues of an aliphatic diamine having from 6 to 10 carbon atoms,
   Y denotes the residues of an aliphatic dicarboxylic acid having from 10 to 14 carbon atoms,
   Y2 denotes the residues of an aliphatic dicarboxylic acid having from 15 to 20 carbon atoms,
   Z denotes at least one unit chosen from the residues of a lactam, the residues of an α,ω-aminocarboxylic acid and the unit X1, Y1 in which X1 denotes the residues of an aliphatic diamine and Y1 denotes the residues of an aliphatic dicarboxylic acid, the ratios by weight Z/(X+Y+Z) and Z/(6+Y2+Z) being between 0 and 15%, and
   a semiaromatic polyamide B,
   wherein at least one of the layers contains a product which facilitates adhesion to the adjacent layer.

2. A multilayer hose for compressed air consisting of, in this order:
   an outer layer (1) made of polyamide,
   an inner layer (2) of a polymer having a flexural modulus of less than 500 MPa, wherein said polymer is selected from the group consisting of ethylene copolymer(s) and propylene copolymer(s),
   an intermediate layer (3) of a polymer having a flexural modulus of greater than 1100 MPa, the inner layer (3) being in contact with compressed air, wherein said inner layer polymer (3) is selected from the group consisting of polycarbonate (PC), polyphenyene sulfide (PPS), polyphenylene oxide (PPO) and a polyamide selected from the group consisting of PA 6, PA 6,6, PA 6,10, PA 6,12, an aromatic polyamide and a semiaromatic polyamide, or inner layer (3) optionally is replaced by three adjacent layers successively composed of a layer of polymer having a flexural modulus of greater than 1100 MPa, of a braid and of a layer of polymer having a flexural modulus of greater than 1100 MPa, optionally a layer (4) of a polymer having a flexural modulus of less than 500 MPa, and an inner layer (5) of a polymer chosen from polyamides, blends of polyamide and of polyolefin comprising a polyamide matrix, copolymers comprising polyamide blocks and polyether blocks, or blends of polyamides and of copolymers comprising polyamide blocks and polyether blocks, the inner layer (5) being in contact with the compressed air, wherein the polyamide of the outer layer (1) is chosen from:

PA11,
PA12, a polyamide A corresponding to the formula X,Y/Z or 6,Y2/Z, in which:
  X denotes the residues of an aliphatic diamine having from 6 to 10 carbon atoms,
  Y denotes the residues of an aliphatic dicarboxylic acid having from 10 to 14 carbon atoms,
  Y2 denotes the residues of an aliphatic dicarboxylic acid having from 15 to 20 carbon atoms,
  Z denotes at least one unit chosen from the residues of a lactam, the residues of an α,ω-aminocarboxylic acid and the unit X1, Y1 in which X1 denotes the residues of an aliphatic diamine and Y1 denotes the residues of an aliphatic dicarboxylic acid, the ratios by weight Z/(X+Y+Z) and Z/(6+Y2+Z) being between 0 and 15%, and a semiaromatic polyamide B, and wherein optionally at least one of the layers contains a product which facilitates adhesion to the adjacent layer.

3. The hose as claimed in claim 2, wherein polyamide A of the outer layer is selected from the group consisting of PA 6,14, PA 6,18 and PA 10,10.

4. The hose as claimed in claim 2, wherein polyamide B of the outer layer is selected from the group consisting of PA 6,1I6,T, PA 6,6/6,1I6,T, PA 6/6,T, PA 11/10,T, PA 12/12,T, PA 10,10/10,T and PA 10,I/10,T.

5. The hose as claimed in claim 2, wherein at least one of the layers contains a product which facilitates adhesion to the adjacent layer.

6. The hose as claimed in claim 2, wherein the inner layer (3) of the polymer having a flexural modulus of greater than 1100 MPa is replaced by three adjacent layers successively composed of a layer of polymer having a flexural modulus of greater than 1100 MPa, of a braid and of a layer of polymer having a flexural modulus of greater than 1100 MPa.

7. A multilayer hose for compressed air consisting of, in this order:
  an outer layer (1) made of polyamide,
  an inner layer (3) of a polymer having a flexural modulus of greater than 1100 MPa, the inner layer (3) being in contact with compressed air, wherein said inner layer polymer (3) is selected from the group consisting of polycarbonate (PC), polyphenyene sulfide (PPS), polyphenylene oxide (PPO) and a polyamide selected from the group consisting of PA 6, PA 6,6, PA 6,10, PA 6,12, an aromatic polyamide and a semiaromatic polyamide, or inner layer (3) optionally is replaced by three adjacent layers successively composed of a layer of polymer having a flexural modulus of greater than 1100 MPa, of a braid and of a layer of polymer having a flexural modulus of greater than 1100 MPa, optionally a layer (4) of a polymer having a flexural modulus of less than 500 MPa, and an inner layer (5) of a polymer chosen from polyamides, blends of polyamide and of polyolefin comprising a polyamide matrix, copolymers comprising polyamide blocks and polyether blocks, or blends of polyamides and of copolymers comprising polyamide blocks and polyether blocks, the inner layer (5) being in contact with the compressed air, wherein the polyamide of the outer layer (1) is chosen from:

PA11,
PA12, a polyamide A corresponding to the formula X,Y/Z or 6,Y2/Z, in which:
  X denotes the residues of an aliphatic diamine having from 6 to 10 carbon atoms,
  Y denotes the residues of an aliphatic dicarboxylic acid having from 10 to 14 carbon atoms,
  Y2 denotes the residues of an aliphatic dicarboxylic acid having from 15 to 20 carbon atoms,
  Z denotes at least one unit chosen from the residues of a lactam, the residues of an α,ω-aminocarboxylic acid and the unit X1, Y1 in which X1 denotes the residues of an aliphatic diamine and Y1 denotes the residues of an aliphatic dicarboxylic acid, the ratios by weight Z/(X+Y+Z) and Z/(6+Y2+Z) being between 0 and 15%, and a semiaromatic polyamide B, and wherein optionally at least one of the layers contains a product which facilitates adhesion to the adjacent layer.

8. The hose as claimed in claim 7, wherein polyamide A of the outer layer is selected from the group consisting of PA 6,14, PA 6,18 and PA 10,10.

9. The hose as claimed in claim 7, wherein polyamide B of the outer layer is selected from the group consisting of PA 6,I/6,T, PA 6,6/6,I/6,T, PA 6/6,T, PA 11/10,T, PA 12/12,T, PA 10,10/10,T and PA 10,I/10,T.

10. The hose as claimed in claim 7, wherein at least one of the layers comprises a product which facilitates adhesion to the adjacent layer.

11. The hose as claimed in claim 7, wherein the inner layer (3) of the polymer having a flexural modulus of greater than 1100 MPa is replaced by three adjacent layers successively composed of a layer of polymer having a flexural modulus of greater than 1100 MPa, of a braid and of a layer of polymer having a flexural modulus of greater than 1100 MPa.

* * * * *